(12) United States Patent
Oikawa et al.

(10) Patent No.: US 10,378,366 B2
(45) Date of Patent: Aug. 13, 2019

(54) STEAM TURBINE ROTOR BLADE AND METHOD FOR MANUFACTURING STEAM TURBINE ROTOR BLADE

(71) Applicant: MITSUBISHI HITACHI POWER SYSTEMS, LTD., Yokohama (JP)

(72) Inventors: Shinji Oikawa, Yokohama (JP); Masahiko Arai, Yokohama (JP); Hiroyuki Doi, Yokohama (JP); Hideo Yoda, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 15/562,912

(22) PCT Filed: Apr. 11, 2016

(86) PCT No.: PCT/JP2016/061677
§ 371 (c)(1),
(2) Date: Sep. 29, 2017

(87) PCT Pub. No.: WO2016/167214
PCT Pub. Date: Oct. 20, 2016

(65) Prior Publication Data
US 2018/0080329 A1    Mar. 22, 2018

(30) Foreign Application Priority Data
Apr. 17, 2015   (JP) ................. 2015-084960

(51) Int. Cl.
*F01D 5/28* (2006.01)
*F01D 25/00* (2006.01)
(Continued)

(52) U.S. Cl.
CPC .............. *F01D 5/286* (2013.01); *B23K 10/02* (2013.01); *B23K 10/027* (2013.01); *B23K 15/00* (2013.01);
(Continued)

(58) Field of Classification Search
CPC ........ F01D 5/288; F01D 11/122; F01D 5/282; F01D 5/286; F01D 5/28; F01D 5/3092;
(Continued)

(56) References Cited

U.S. PATENT DOCUMENTS 5,068,003 A * 11/1991 Takahashi ........... C22C 32/0052
148/316
5,141,574 A    8/1992 Takahashi et al.
(Continued)

FOREIGN PATENT DOCUMENTS

EP     2590773 A2    5/2013
JP     63-096233 A    4/1988
(Continued)

OTHER PUBLICATIONS

Extended European Search Report dated Oct. 12, 2018 for the European Patent Application No. 16780005.1.
(Continued)

*Primary Examiner* — Long T Tran
(74) *Attorney, Agent, or Firm* — Volpe and Koenig, P.C.

(57) ABSTRACT

A steam turbine rotor blade achieving both abrasion resistance and reliability, and a method for manufacturing a steam turbine rotor blade capable of obtaining such a steam turbine rotor blade are provided. A steam turbine rotor blade according to the invention is characterized by including a blade base material and an erosion shield formed on a surface of the blade base material, wherein the blade base material is composed of a titanium alloy, and the erosion shield is composed of a weld overlay layer including a parent phase composed of pure titanium in which a metal element is solid-dissolved or a titanium alloy in which a metal element is solid-dissolved, and a hard phase dispersed in the parent phase.

18 Claims, 3 Drawing Sheets

(51) Int. Cl.
  *B23K 10/02*   (2006.01)
  *B23K 15/00*   (2006.01)
  *B23K 31/00*   (2006.01)
  *C22C 14/00*   (2006.01)
  *C22F 1/02*    (2006.01)
  *C22F 1/18*    (2006.01)
  *B23K 26/342*  (2014.01)
  *B23K 26/21*   (2014.01)
  *B23K 31/02*   (2006.01)
  *B23K 35/32*   (2006.01)
  *F01D 5/14*    (2006.01)
  *C22C 1/02*    (2006.01)
  *B23K 101/00*  (2006.01)
  *B23K 103/14*  (2006.01)
  *C22F 1/00*    (2006.01)

(52) U.S. Cl.
  CPC .......... *B23K 15/0093* (2013.01); *B23K 26/21* (2015.10); *B23K 26/342* (2015.10); *B23K 31/00* (2013.01); *B23K 31/02* (2013.01); *B23K 35/325* (2013.01); *B23K 35/327* (2013.01); *C22C 1/02* (2013.01); *C22C 14/00* (2013.01); *C22F 1/02* (2013.01); *C22F 1/18* (2013.01); *C22F 1/183* (2013.01); *F01D 5/147* (2013.01); *F01D 5/28* (2013.01); *F01D 25/00* (2013.01); *B23K 2101/001* (2018.08); *B23K 2103/14* (2018.08); *C22F 1/00* (2013.01); *F05D 2220/31* (2013.01); *F05D 2230/31* (2013.01); *F05D 2240/307* (2013.01); *F05D 2300/174* (2013.01); *F05D 2300/2262* (2013.01)

(58) Field of Classification Search
  CPC ........ F01D 9/041; F01D 25/005; F01D 25/00; F01D 25/007
  See application file for complete search history.

(56) References Cited

U.S. PATENT DOCUMENTS

| | | | | |
|---|---|---|---|---|
| 5,551,840 A | * | 9/1996 | Benoit | F01D 11/12 416/241 B |
| 5,573,604 A | * | 11/1996 | Gerdes | C23C 8/06 148/210 |
| 7,354,651 B2 | * | 4/2008 | Hazel | C04B 41/009 416/241 R |
| 7,666,516 B2 | * | 2/2010 | Nazmy | C23C 4/02 416/241 B |
| 9,370,795 B2 | * | 6/2016 | Barnikel | B23K 35/32 |
| 2004/0191064 A1 | * | 9/2004 | Guo | B23P 6/007 416/191 |
| 2006/0073019 A1 | * | 4/2006 | Wettstein | F01D 5/20 416/203 |
| 2010/0242843 A1 | | 9/2010 | Peretti et al. | |
| 2013/0259698 A1 | * | 10/2013 | Jones | B23K 26/34 416/224 |
| 2014/0272464 A1 | | 9/2014 | Barnikel et al. | |

FOREIGN PATENT DOCUMENTS

| | | |
|---|---|---|
| JP | 63-255357 A | 10/1988 |
| JP | 01-077702 A | 3/1989 |
| JP | 02-163403 A | 6/1990 |
| JP | 03-150331 A | 6/1991 |
| JP | 06-287770 A | 10/1994 |
| JP | 2010-222705 A | 10/2010 |
| JP | 2014-530958 A | 11/2014 |

OTHER PUBLICATIONS

International Search Report, PCT/JP2016/061677, dated Jun. 14, 2016, 2 pgs.
Korean Office Action dated Sep. 5, 2018 for the Korean Patent Application No. 10-2017-7027221.
Korean Office Action dated Mar. 5, 2019 for the Korean Patent Application No. 10-2017-7027221.
Chinese Office Action dated Nov. 2, 2018 for the Chinese Patent Application No. 201680018267.0.
Chinese Office Action dated May 15, 2019 for the Chinese Patent Application No. 201680018267.0.

* cited by examiner

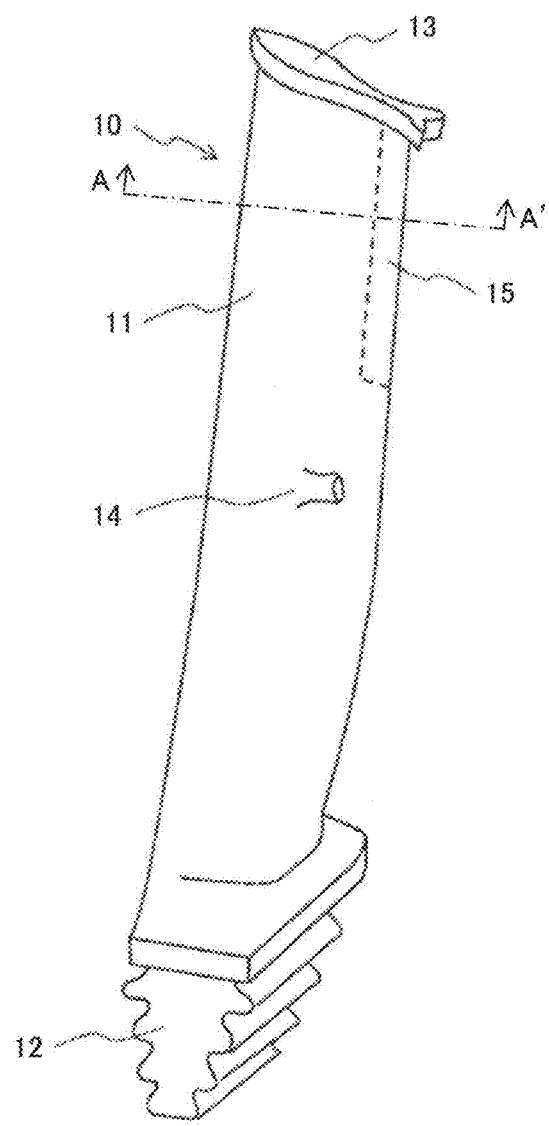

STEAM TURBINE ROTOR BLADE AND METHOD FOR MANUFACTURING STEAM TURBINE ROTOR BLADE

TECHNICAL FIELD

The present invention relates to a steam turbine rotor blade and a method for manufacturing a steam turbine rotor blade.

BACKGROUND ART

Recently, from the viewpoint of energy saving (for example, fossil energy saving) and prevention of global warming (for example, reduction of $CO_2$ gas emissions), the improvement of efficiency (for example, the improvement of efficiency of steam turbines) of thermal power generation plants has been desired. One of the effective means for improving the efficiency of steam turbines is to increase the length of a steam turbine long blade (rotor blade). The steam turbine long blade has a problem of abrasion (erosion) of a tip portion by collision with water droplets. Erosion becomes severe because the peripheral speed of the tip portion increases as the length of the steam turbine long blade is increased. Conventionally, for the steam turbine long blade, a titanium-based alloy and an iron and steel material are used. A titanium-based material has a lower specific gravity than that of an iron and steel material, and therefore is a material suitable for increasing the length of the steam turbine long blade.

In general, in a steam turbine long blade, a forged plate having excellent abrasion resistance called "erosion shield" is bonded to a blade tip portion. As an erosion shield material for a titanium-based long blade (a long blade using a titanium-based material), a titanium-based material is used for adapting the thermal expansion coefficient, however, the titanium-based material has lower abrasion resistance than the iron and steel material, and therefore, it is difficult to further increase the length of the blade.

Therefore, in order to make a steam turbine to achieve both high efficiency and reliability, an erosion shield having excellent abrasion resistance for use in a titanium-based long blade has been demanded. As an example of a shielding method, there is a method for forming a hard ceramic coating film by vapor deposition or the like on a blade tip portion (see, for example, PTL 1).

Further, PTL 2 discloses a surface treatment method for a steam turbine rotor blade, characterized in that a blade tip leading edge portion of a steam turbine low-pressure last stage blade composed of a titanium alloy is finished into a predetermined shape by machining, and thereafter, the surface of a base material is melted by a high-energy density source, and a ceramic powder is dispersed and overlay-welded in the base material.

Further, PTL 3 discloses a method for manufacturing a corrosion resistant alloy, characterized in that a mixture composed of a ceramic powder at a volume ratio of 20 to 60% and the remainder substantially consisting of titanium or a titanium alloy powder is prepared, and thereafter, this mixture is fired in vacuum or in an inert gas, and molded by a hot isostatic pressing process.

CITATION LIST

Patent Literature

PTL 1: JP-A-63-255357
PTL 2: JP-A-6-287770
PTL 3: JP-A-3-150331

SUMMARY OF INVENTION

Technical Problem

However, the erosion shield formed by vapor deposition described in the above PTL 1 has a film thickness of several tens of micrometers and is extremely thin, and therefore, sufficient reliability may not be obtained. Further, also in the technique described in PTL 2, the thickness of the hard coating film is not sufficient, and therefore, a sufficient strength and reliability may not be obtained, either. Still further, even in the technique described in PTL 3, the strength may be not sufficient. That is, the conventional erosion shields did not sufficiently achieve both abrasion resistance and reliability.

In view of the above circumstances, the invention provides a steam turbine rotor blade achieving both abrasion resistance and reliability, and a method for manufacturing a steam turbine rotor blade capable of obtaining such a steam turbine rotor blade.

Solution to Problem

One embodiment of the steam turbine rotor blade according to the invention is characterized by including a blade base material and an erosion shield formed on a surface of the blade base material, wherein the blade base material is composed of a titanium alloy, and the erosion shield is composed of a weld overlay layer including a parent phase composed of pure titanium in which a metal element is solid-dissolved or a titanium alloy in which a metal element is solid-dissolved, and a hard phase dispersed in the parent phase.

Further, another embodiment of the steam turbine rotor blade according to the invention is characterized by including a blade base material and an erosion shield formed on a surface of the blade base material, wherein the blade base material is composed of a titanium alloy, the erosion shield is a weld overlay layer formed by melting parent phase particles and inorganic compound particles, the parent phase particles are composed of pure titanium or a titanium alloy, and some of the inorganic compound particles are solid-dissolved in the parent phase particles, and some of the other inorganic compound particles react with some of the parent phase particles to form a hard phase and the hard phase is dispersed in the parent phase.

Further, the method for manufacturing a steam turbine rotor blade according to the invention is a method for manufacturing a steam turbine rotor blade including a blade base material composed of a titanium alloy and an erosion shield formed on a surface of the blade base material, and is characterized in that the method comprises a step of forming the erosion shield on a surface of the blade base material, the step of forming the erosion shield includes a step of forming a weld overlay layer by melting a welding raw material powder containing a raw material powder of parent phase particles composed of pure titanium or a titanium alloy and a raw material powder of inorganic compound particles by a heat source on the blade base material, and some of the inorganic compound particles are solid-dissolved in the parent phase particles, and some of the other inorganic compound particles react with some of the parent phase particles to form a hard phase and the hard phase is dispersed in the parent phase.

Advantageous Effects of Invention

According to the invention, a steam turbine rotor blade achieving both abrasion resistance and reliability, and a method for manufacturing a steam turbine rotor blade capable of obtaining such a steam turbine rotor blade can be provided.

BRIEF DESCRIPTION OF DRAWINGS

FIG. 1 is a schematic view showing one example of a steam turbine rotor blade according to the invention.

DESCRIPTION OF EMBODIMENTS

Figure 2A:
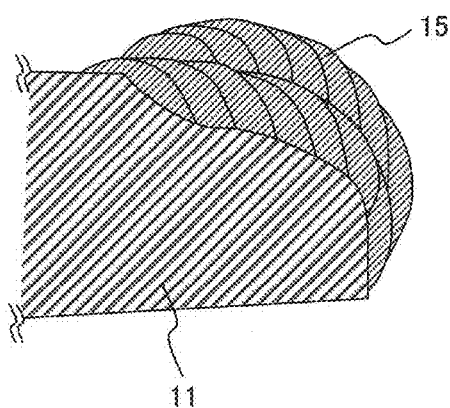
FIG. 2A is a view schematically showing one example of a cross section of a blade base material and an erosion shield in FIG. 1.

Hereinafter, a steam turbine rotor blade and a method for manufacturing a steam turbine rotor blade according to the invention will be described in detail. However, the invention is not limited to the embodiments described herein, and the embodiments can be combined or modified without changing the gist of the invention.

[Steam Turbine Rotor Blade]

FIG. 1 is a schematic view showing one example of a steam turbine rotor blade according to the invention. As shown in FIG. 1, a steam turbine rotor blade 10 according to the invention includes a blade base material 11 composed of a titanium alloy, and an erosion shield 15 formed on a surface of the blade base material 11. In FIG. 1, the erosion shield 15 is formed at a tip of the blade base material 11 where the peripheral speed is high and abrasion further increases. In addition, the blade base material 11 includes a stub 14 for integrating the adjacent blade by torsion, and a continuous cover 13. This steam turbine rotor blade 10 is an axial entry type having a blade root portion 12 with an inverted Christmas tree shape.

Figure 2B:
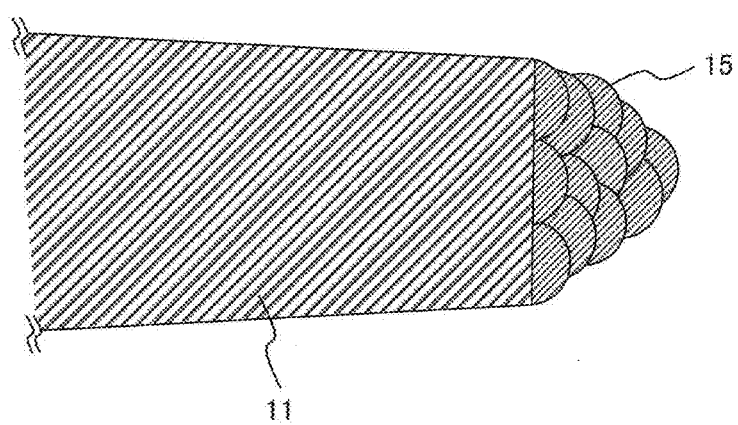
FIG. 2B is a view schematically showing another example of a cross section of a blade base material and an erosion shield in FIG. 1.

FIG. 2A is a view schematically showing one example of a cross section taken along the line A-A' of the blade base material and the erosion shield in FIG. 1, and FIG. 2B is a view schematically showing another example of a cross section taken along the line A-A' of the blade base material and the erosion shield in FIG. 1. As shown in FIGS. 2A and 2B, the erosion shield 15 according to the invention is formed of a weld overlay layer (hereinafter also referred to as "overlay layer") (hereinafter the reference numeral 15 also refers to "weld overlay layer"). The weld overlay layer 15 may be formed from a side edge to a wide surface of the blade base material 11 as shown in FIG. 2A, or may be formed only at a side edge of the blade base material 11 as shown in FIG. 2B. This weld overlay layer 15 is characterized by including a parent phase composed of pure titanium in which a metal element is solid-dissolved or a titanium alloy in which a metal element is solid-dissolved, and a hard phase dispersed in the parent phase. Hereinafter, the respective phases will be described in detail.

(1) Parent Phase

The parent phase (matrix) constituting the weld overlay layer 15 is formed from the same material as that of the blade base material 11, that is, a material in which a metal element is solid-dissolved in pure titanium or a titanium alloy. As the titanium alloy, for example, 6Al-4V—Ti or 15Mo-5Zr-3Al—Ti can be used. By forming the parent phase of the weld overlay layer 15 from the same material as that of the blade base material 11, the difference in the thermal expansion coefficient from the blade base material 11 is reduced, and the close adhesion between the blade base material 11 and the weld overlay layer 15 can be enhanced.

In the weld overlay layer 15 according to the invention, a metal element is solid-dissolved in the above-mentioned parent phase. By solid-dissolving the metal element in the above-mentioned parent phase in this manner, the parent phase is hardened so as to improve the hardness of the weld overlay layer 15, and therefore, the abrasion resistance can be improved. This metal element is derived from inorganic compound particles as described in the below-mentioned manufacturing method. It is necessary that the metal element should be a material which is solid-dissolved in the parent phase to harden the parent phase, and specifically, chromium (Cr), iron (Fe), and the like are preferred. Incidentally, whether the above-mentioned metal element is in a state of being solid-dissolved in the parent phase can be evaluated by determining the crystalline structure and lattice constant of the parent phase of the weld overlay layer 15 by X-ray diffraction (XRD) measurement.

(2) Hard Phase

The weld overlay layer 15 according to the invention includes a hard phase dispersed in the parent phase. By including such a hard phase, also the hardness of the weld overlay layer 15 can be improved in addition to the parent phase in which the above-mentioned metal element is solid-dissolved. This hard phase is a phase produced by reacting part of the parent phase with a material derived from inorganic compound particles as described in the below-mentioned manufacturing method. As the hard phase, a phase containing at least one of titanium carbide, titanium silicide, and titanium boride can be exemplified. Incidentally, this hard phase can be analyzed by XRD measurement of the weld overlay layer 15.

The erosion shield 15 according to the invention is a weld overlay layer including the above-mentioned parent phase and hard phase, and has a melted and solidified structure, and therefore is clearly different from the structure of the hard film formed by vapor deposition in the above-mentioned PTL 1. Further, the thickness of the weld overlay layer of the invention is not particularly limited, however, a weld overlay layer having a thickness of 20 mm or more can be formed, and is thicker than the hard film having a film thickness of several tens of micrometers described in PTL 1, and therefore, the reliability of the steam turbine rotor blade can be enhanced.

In PTL 2, the surface of the blade base material is melted, and a ceramic powder is fed to the melted region, whereby the weld overlay layer is formed. However, when the feeding amount of the ceramic powder is increased, the ceramic powder is not diffused in the base material, and therefore, the composition of the weld overlay layer to be obtained is the same as the composition of the ceramic powder, and thus, a weld overlay layer having a structure in which a hard phase derived from inorganic compound particles is dispersed in a parent phase composed of pure titanium in which a metal element is solid-dissolved or a titanium alloy in which a metal element is solid-dissolved as in the invention is not formed.

Further, also in the case where the ceramic powder (SiC, BN, or the like) described in PTL 3 is used, a structure in which a hard phase derived from inorganic compound particles is dispersed in a parent phase composed of pure titanium in which a metal element is solid-dissolved or a titanium alloy in which a metal element is solid-dissolved as in the invention is not formed.

The steam turbine rotor blade according to the invention includes the erosion shield having both excellent abrasion resistance and excellent reliability. The application place of the steam turbine rotor blade is of course not limited, but is preferably a last stage of a steam turbine where the humidity is highest, and in such a case, the effect of the invention can be exhibited most strongly.

[Method for Manufacturing Steam Turbine Rotor Blade]

Next, a method for manufacturing a steam turbine rotor blade according to the invention will be described. The method for manufacturing a steam turbine rotor blade according to the invention includes a step of forming an erosion shield on a blade base material 11, and this step of forming the erosion shield includes a step of forming a weld overlay layer by melting a welding raw material powder containing a raw material powder of parent phase particles and a raw material powder of inorganic compound particles by a heat source on the blade base material 11. Specifically, a mixed powder (welding raw material powder) obtained by mixing a raw material powder of parent phase particles (parent powder) constituting the above-mentioned parent phase with inorganic compound particles is prepared. Subsequently, the above-mentioned mixed powder is melted by a heat source on the blade base material 11 to form an overlay layer. The type of the heat source is not particularly limited, but examples thereof include a laser, a plasma transfer arc, and an electron beam.

As the inorganic compound particles, inorganic compound particles in which some are solid-dissolved in the parent phase, and some react with the parent phase to form a hard phase are used. Specifically, the inorganic compound particles preferably contain at least one of chromium carbide, chromium silicide, chromium boride, and iron boride, and among these, from the viewpoint of improving the hardness of the weld overlay layer 15, chromium boride is particularly preferred. In the case of using such a compound, a metal element (chromium or iron) constituting the inorganic compound particles is solid-dissolved in the parent phase in the process of melting to harden the parent phase. Further, an element (carbon, silicon, or boron) other than the metal element to be solid-dissolved in the parent phase of the inorganic compound particles reacts with part of the parent phase to form a hard phase.

The content of the inorganic compound particles in the raw material powder is preferably from 5 to 15 vol %. When the content is less than 5 vol %, an effect of hardening the parent phase is not sufficiently obtained. Further, when the content is more than 15 vol %, the hardening of the parent phase excessively proceeds to generate a crack when welding. Incidentally, a preferred range of the content does not depend on the type of the inorganic compound particles.

Incidentally, as manufacturing steps, a step of forming a welding shield groove portion in a portion of the blade base material 11 where the erosion shield 15 is formed, a step of annealing the weld overlay layer 15, and a step of machining the weld overlay layer 15 into a final shape may be included. The annealing is preferably performed in vacuum by setting the retention temperature to 450° C. to 550° C. (450° C. or higher and 550° C. or lower) and the retention time to 8 to 10 hours. By selecting a heat source whose heat input is small, annealing to remove residual stress can be omitted.

The method for manufacturing a steam turbine rotor blade according to the invention is characterized by using a mixed powder obtained by mixing a parent powder with an inorganic compound powder so as to obtain the structure of the weld overlay layer described above. According to such a manufacturing method, the metal element in the inorganic compound particles is solid-dissolved in the parent phase to harden the parent phase, and further, due to a hard phase produced by reacting the parent phase with the inorganic compound particles, the hardness of the weld overlay layer can be further improved.

EXAMPLES

Hereinafter Examples will be described.

Example 1

(I) Element Test
(i) Fabrication of Test Piece

A method for fabricating test pieces (Inventive Materials Nos. 1 to 7 and Comparative Materials Nos. 8 to 11) subjected to an element test will be described. As the base material of Nos. 1 to 10, a 6Al-4V—Ti alloy was prepared, and as the base material of No. 11, a 15Mo-5Zr-3Al—Ti alloy forged plate was prepared. With respect to No. 1 to 10, a parent powder (titanium-based powder) which is the raw material powder of the parent phase particles and an inorganic compound powder which is the raw material powder of the inorganic compound particles are fed from different powder pods to a welding portion of the base material to give a predetermined mixing ratio, and melted on the surface of the base material by a laser, whereby a weld overlay layer was formed. The composition of the welding material and the composition of the hard phase are shown in the following Table 1. Incidentally, the descriptions in the parentheses in the column of "Inorganic compound powder" each denote the content of the inorganic compound powder in the raw material powder.

(ii) Evaluation

As the evaluation of the microstructure of the overlay layer, light microscopic observation and XRD measurement were performed. Further, the hardness of the overlay layer was evaluated by the Vickers hardness test. The test was performed in accordance with JIS (Japanese Industrial Standards) Z 2244. The evaluation of the abrasion resistance was performed by the water jet test. The evaluation results are also shown in the following Table 1.

TABLE 1

| | No. | Raw material powder | | Structure of weld overlay layer | | Evaluation results | | |
| --- | --- | --- | --- | --- | --- | --- | --- | --- |
| | | Parent powder (titanium-based powder) | Inorganic compound powder | Parent phase | Hard phase | Hardness (HV) | Abrasion resistance (thinning depth ratio) | Remarks |
| Inventive material | 1 | 6Al—4V—Ti | Cr carbide (5 vol %) | Cr solid-dissolved in 6Al—4V—Ti | Titanium carbide | 402 | 0.83 | good |
| | 2 | 6Al—4V—Ti | Cr carbide (10 vol %) | Cr solid-dissolved in 6Al—4V—Ti | Titanium carbide | 444 | 0.51 | good |

TABLE 1-continued

|  | No. | Raw material powder | | Structure of weld overlay layer | | Evaluation results | | Remarks |
|---|---|---|---|---|---|---|---|---|
|  |  | Parent powder (titanium-based powder) | Inorganic compound powder | Parent phase | Hard phase | Hardness (HV) | Abrasion resistance (thinning depth ratio) |  |
|  | 3 | 6Al—4V—Ti | Cr carbide (15 vol %) | Cr solid-dissolved in 6Al—4V—Ti | Titanium carbide | 523 | 0.23 | good |
|  | 4 | 6Al—4V—Ti | Cr silicide (10 vol %) | Cr solid-dissolved in 6Al—4V—Ti | Titanium silicide | 420 | 0.62 | good |
|  | 5 | 6Al—4V—Ti | Cr boride (10 vol %) | Cr solid-dissolved in 6Al—4V—Ti | Titanium boride | 475 | 0.38 | good |
|  | 6 | 6Al—4V—Ti | Fe boride (10 vol %) | Fe solid-dissolved in 6Al—4V—Ti | Titanium boride | 488 | 0.39 | good |
|  | 7 | Pure titanium | Cr carbide (10 vol %) | Cr solid-dissolved in pure titanium | Titanium carbide | 432 | 0.58 | good |
| Comparative material | 8 | 6Al—4V—Ti | Cr carbide (2.5 vol %) | Cr solid-dissolved in 6Al—4V—Ti | Titanium carbide | 369 | 1.11 | Abrasion resistance is not improved. |
|  | 9 | 6Al—4V—Ti | Cr carbide (20 vol %) | Cr solid-dissolved in 6Al—4V—Ti | Titanium carbide | 559 | — | Crack is generated. |
|  | 10 | 6Al—4V—Ti | Ti carbide (10 vol %) | 6Al—4V—Ti | Titanium carbide | 434 | 1.44 | Abrasion resistance is not improved |
|  | 11 | 15Mo—5Zr—3Al—Ti (forged plate) | — | 15Mo—5Zr—3Al—Ti (forged plate) | — | 375 | 1 | currently used shield material |

In Table 1, Nos. 1 to 7 are Examples according to the invention, and Nos. 10 and 11 are Comparative Examples. Nos. 8 and 9 are Reference Examples, and are not known materials because the preferred parent powder and the preferred inorganic compound powder of the invention are used as the weld overlay layer, however, the content of the inorganic compound powder is outside the preferred range of the invention. From the results shown in Table 1, Nos. 1 to 7 according to the present Examples all have an excellent hardness and excellent abrasion resistance. As a result of evaluation of the crystalline structure and lattice constant of pure titanium or the titanium alloy to serve as the parent phase by XRD measurement with respect to the test pieces of Nos. 1 to 10, it was confirmed that the metal element is solid-dissolved in the parent phase, and the hard phase is formed and dispersed in the parent phase. Hereinafter, the evaluation results of the respective test pieces will be described in detail.

In the light microscopic observation of No. 1, a spherical deposit with a size of several tens of micrometers was confirmed in the overlay layer. When the spherical deposit was analyzed by XRD measurement, it was confirmed that the deposit is titanium carbide which is not contained in the raw material, and therefore, a hard phase is formed.

Figure 3:
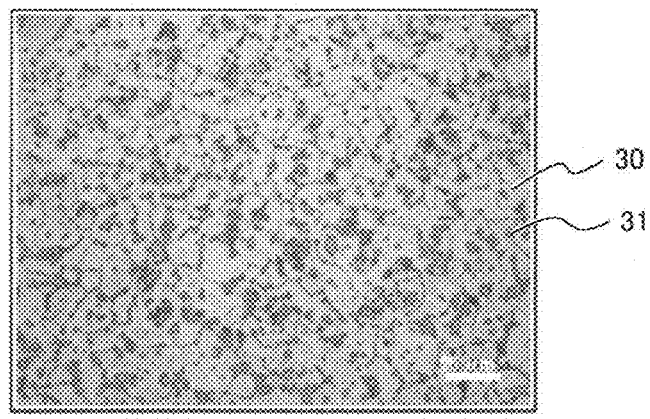
FIG. 3 is a light micrograph of a weld overlay layer of Example (No. 2).

FIG. 3 is a light micrograph of the weld overlay layer of Example (No. 2). As shown in FIG. 3, it is clearly found that a hard phase (black portion) 31 is deposited and dispersed in a parent phase 30 (gray portion).

When comparing No. 1 with No. 3, as the amount of Cr carbide increased, the deposition amount and the size of titanium carbide which is the hard phase increased, and the hardness increased. In Nos. 4 and 5, as the inorganic compound powder, Cr silicide and Cr boride were used, respectively, however, it was confirmed that titanium boride and titanium silicide are formed, respectively, as the hard phase in the overlay layer. In No. 6, as the inorganic compound powder, Fe boride was used, however, it was confirmed that titanium boride is formed in the overlay layer in the same manner as in No. 5. In No. 7, pure titanium was used as the titanium-based powder, however, titanium carbide was confirmed as the hard phase in the overlay layer in the same manner as in Nos. 1 to 3. From the comparison of Nos. 2, 4, and 5, when the hard phase is titanium boride, higher hardness and more excellent abrasion resistance than in the case where the hard phase is titanium carbide or titanium silicide were obtained.

In No. 8 which is a comparative material, the content of the inorganic compound powder was not sufficient, and the parent phase was not sufficiently hardened, and therefore, improvement of the abrasion resistance was not observed. In No. 9 which is a comparative material, the content of the inorganic compound powder was excessive, and therefore, a crack was generated in the overlay layer. Further, in No. 10, titanium carbide was confirmed, however, melting by a laser was not sufficient, and the particle diameter was equivalent to that of the raw material powder. Therefore, the metal element was not solid-dissolved in the parent phase.

The depth of thinning by water jet of the 15Mo-5Zr-3Al—Ti alloy of No. 11, which is a currently used erosion shield material, was set to 1.0, and relative comparison of the depth of thinning with the respective test pieces was performed. As a result, the amount of thinning of the inventive material was smaller than that of the comparative material, and therefore, improvement of the abrasion resistance was confirmed. Further, there was a tendency that as the amount of the inorganic compound is larger and the hardness is higher, the thinning amount decreases. In No. 9 which is a comparative material, a crack was generated in the overlay layer, and therefore, the abrasion resistance could not be evaluated. Further, in No. 10, the inorganic compound powder did not contain an element which reacts with the parent phase to form a hard phase, and the abrasion resistance was not improved.

Example 2

(II) Test Production of Actual Machine

An example in which the steam turbine rotor blade according to the invention was used in an actual machine will be described. A 40-inch steam turbine titanium long blade composed of a 6Al-4V—Ti alloy was fabricated. As a method for fabricating the steam turbine titanium long blade, closed-die forging was performed for a 6Al-4V—Ti alloy billet using a 40-inch blade die. Thereafter, a heat treatment for adjusting the microstructure was performed. Subsequently, the entire blade was machined into a predetermined shape, and a shield welding groove portion was provided in a tip portion. In the shield welding groove portion, the raw material shown in No. 2 in Table 1 was melted by a laser, and overlay welding was performed. As final processing, processing of the overlay layer, or surface polishing or bend straightening of the entire blade was performed, whereby a 40-inch long blade was formed.

When a defect inspection of the erosion shield portion of the steam turbine rotor blade obtained by the above-mentioned step was performed, no problem was observed. Further, when the erosion resistance of the steam turbine titanium long blade was evaluated in a verification test facility, thinning due to erosion by long-term use was almost not observed and was at a level free from problems, and it was confirmed that the reliability is excellent.

As described above, it was demonstrated that according to the invention, a steam turbine rotor blade achieving both abrasion resistance and reliability, and a method for manufacturing a steam turbine rotor blade capable of obtaining such a steam turbine rotor blade can be provided.

Incidentally, the above-mentioned embodiments specifically describe the invention for facilitating the understanding of the invention, and the invention is not limited to those including all the configurations described above. For example, part of the configuration of a certain embodiment can be replaced with the configuration of another embodiment, or the configuration of another embodiment can be added to the configuration of a certain embodiment. In addition, part of the configuration of each embodiment can be deleted or replaced with another configuration, or another configuration can be added thereto.

REFERENCE SIGNS LIST

10: steam turbine rotor blade, 11: blade base material, 12: root portion, 13: continuous cover, 14: stub, 15: erosion shield, 30: parent phase, 31: hard phase

The invention claimed is:

1. A steam turbine rotor blade, comprising:
a blade base material that is composed of a titanium alloy; and
an erosion shield formed on a surface of the blade base material, wherein the erosion shield is composed of:
a weld overlay layer that includes a parent phase composed of pure titanium in which a metal element is solid-dissolved or a titanium alloy in which the metal element is solid-dissolved, and
a hard phase that is dispersed in the parent phase, wherein the hard phase is composed of titanium silicide.

2. The steam turbine rotor blade according to claim 1, wherein the weld overlay layer has a melted and solidified structure.

3. The steam turbine rotor blade according to claim 1, wherein the metal element includes chromium.

4. The steam turbine rotor blade according to claim 1, wherein the erosion shield has a thickness of 20 mm or more.

5. The steam turbine rotor blade according to claim 1, wherein the titanium alloy is 6Al-4V—Ti or 15Mo-5Zr-3Al—Ti.

6. The steam turbine rotor blade according to claim 1, wherein the erosion shield is provided in a tip portion of the steam turbine rotor blade.

7. The steam turbine rotor blade according to claim 1, wherein the steam turbine rotor blade is a long blade to be used for a last stage of a steam turbine.

8. The steam turbine rotor blade according to claim 1, wherein the metal element includes iron.

9. A method for forming an erosion shield on a surface of a blade base material, the method comprising:
forming a weld overlay layer by melting a welding raw material powder containing a raw material powder of parent phase particles composed of pure titanium or a titanium alloy and a raw material powder of inorganic compound particles by a heat source on the blade base material, and
forming a hard phase that is dispersed in the parent phase, wherein the hard phase is composed of titanium silicide.

10. A method for manufacturing a steam turbine rotor blade comprising:
the method for forming the erosion shield according to claim 9;
forming a welding shield groove portion in a portion of the blade base material where the erosion shield is formed;
annealing the weld overlay layer; and
machining the weld overlay layer.

11. The method for manufacturing the steam turbine rotor blade according to claim 10, wherein the erosion shield is provided in a tip portion of the steam turbine rotor blade.

12. The method for manufacturing the steam turbine rotor blade according to claim 10, wherein the steam turbine rotor blade is a long blade to be used for a last stage of a steam turbine.

13. The method for manufacturing forming the erosion shield according to claim 9, wherein the heat source is a laser, a plasma transfer arc, or an electron beam.

14. The method for forming the erosion shield according to claim 9, wherein the weld overlay layer has a melted and solidified structure.

15. The method for forming the erosion shield according to claim 9, wherein the inorganic compound particles contain at least one of chromium carbide, chromium silicide, chromium boride, and iron boride.

16. The method for forming the erosion shield according to claim 9, wherein the erosion shield has a thickness of 20 mm or more.

17. The method for manufacturing forming the erosion shield according to claim 9, wherein a content of the inorganic compound particles in the welding raw material powder is from 5 to 15 vol %.

18. The method for manufacturing forming the erosion shield according to claim 9, wherein the titanium alloy is 6Al-4V—Ti or 15Mo-5Zr-3Al—Ti.

* * * * *